US012099567B2

(12) United States Patent
Marren et al.

(10) Patent No.: US 12,099,567 B2
(45) Date of Patent: Sep. 24, 2024

(54) VIEWPORTS AND SUB-PAGES FOR WEB-BASED USER INTERFACES

(71) Applicant: ServiceNow, Inc., Santa Clara, CA (US)

(72) Inventors: Kevin Marren, Santa Clara, CA (US); Avanish Pathak, Santa Clara, CA (US); Benjamin MacDonald, Santa Clara, CA (US); Forrest Allen Reed, Santa Clara, CA (US); Patrick Scott Wilson, Santa Clara, CA (US); Kapeel Sharadrao Sable, Santa Clara, CA (US); Bojan Beran, Santa Clara, CA (US); Carl David Solis, Santa Clara, CA (US); Bhupal Tiduwar Lambodhar, Santa Clara, CA (US); Austin John Kenny, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 227 days.

(21) Appl. No.: 17/555,947

(22) Filed: Dec. 20, 2021

(65) Prior Publication Data

US 2023/0195826 A1 Jun. 22, 2023

(51) Int. Cl.
*G06F 16/95* (2019.01)
*G06F 3/0482* (2013.01)
(Continued)

(52) U.S. Cl.
CPC ........ *G06F 16/9577* (2019.01); *G06F 3/0482* (2013.01); *G06F 9/451* (2018.02);
(Continued)

(58) Field of Classification Search
CPC .... G06F 16/9577; G06F 3/0482; G06F 9/451; G06F 16/955; G06F 16/958;
(Continued)

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

ServiceNow, Rome Now Platform App Engine, Nov. 22, 2021 (28 pages).

*Primary Examiner* — Hope C Sheffield
(74) *Attorney, Agent, or Firm* — McDonnell Boehnen Hulbert & Berghoff LLP

(57) ABSTRACT

An embodiment may involve web page metadata that defines a web page, first sub-page metadata that defines a first sub-page, and second sub-page metadata that defines a second sub-page, wherein the web page metadata includes specification of a viewport, and wherein the viewport is associated with an identifier. One or more processors may be configured to: receive a request for the web page; resolve the web page metadata into web content, wherein resolving the web page metadata includes: (i) determining, based on the identifier, a route associated with the viewport, (ii) determining, based on the route, a set of conditions associated with the viewport, (iii) determining that a particular condition is satisfied, wherein the particular condition is associated with the first sub-page and (iv) placing, based on the
(Continued)

particular condition being satisfied, the first sub-page metadata in the viewport; and transmit the web content.

20 Claims, 14 Drawing Sheets

(51) Int. Cl.
  *G06F 9/451* (2018.01)
  *G06F 16/955* (2019.01)
  *G06F 16/957* (2019.01)
  *G06F 16/958* (2019.01)
  *H04L 9/40* (2022.01)

(52) U.S. Cl.
  CPC .......... *G06F 16/955* (2019.01); *G06F 16/958* (2019.01); *H04L 63/101* (2013.01); *G06F 2203/04803* (2013.01)

(58) Field of Classification Search
  CPC ............. G06F 2203/04803; G06F 3/14; G06F 16/2457; G06F 16/29; H04L 63/101
  See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0054596 A1* | 3/2012 | Kroger ............... G06Q 30/0277 715/234 |
| 2012/0185759 A1* | 7/2012 | Balinsky .............. G06F 21/6227 715/209 |
| 2014/0019847 A1* | 1/2014 | Osmak .................. G06F 40/186 715/234 |
| 2016/0103563 A1* | 4/2016 | Greenberg ............ G06F 3/0482 715/738 |

(56) References Cited

U.S. PATENT DOCUMENTS

| | | |
|---|---|---|
| 2018/0123940 A1 | 5/2018 | Rimar et al. |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2021/0194764 A1 | 6/2021 | Badyan et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

```
<!DOCTYPE html>
<html>
<body>

<?php
$t = date("H");
echo "<p>The hour (of the server) is " . $t;
echo ", and will give the following message:</p>";

if ($t < "10") {
  echo "Have a good morning!";
} elseif ($t < "20") {
  echo "Have a good day!";
} else {
  echo "Have a good night!";
}
?>

</body>
</html>
```
← 610

```
<!DOCTYPE html>
<html>
<body>

<p>The hour (of the server) is 13, and will give the following message:</p>Have a good day!
</body>
</html>
```
← 612

The hour (of the server) is 13, and will give the following message: ← 614

Have a good day!

FIG. 6B

VIEWPORTS AND SUB-PAGES FOR WEB-BASED USER INTERFACES

BACKGROUND

As web-based user interfaces continue to grow in importance, the limitations of these constructs are becoming apparent. In particular, conditional content can be supported by way of script logic placed into markup language, such using JavaScript or PHP embedded into the HyperText Markup Language (HTML). But doing so requires complex conditional logic to be integrated with the content of a web page. This may be beyond the skillset of many who wish to develop the web page, and does not support delegated authoring for specific sections of the web page.

SUMMARY

The embodiments herein address these and other technical problems by introducing a viewport construct to web pages. A viewport defines a section of a web page in which customizable and dynamic content can be placed. Particularly, one or more sub-pages can be defined for placement in the viewport, and the sub-page shown when the web page is generated may depend on any obtainable state variable related to the web page or the system on which it is hosted. For example, different sub-pages may be displayed based on the type of information being viewed and/or the identity or group membership of the user that is viewing the web page.

Thus, viewports allow different sets of resources to be conditionally displayed in the same web page. But where the viewport approach has advantages over the previous approaches is that viewports are more contextual and the resources displayed in a sub-page can be related to or based on the resources displayed in the main part of the web page. Further, viewports allow there to be different authors for the web page and each of the sub-pages, thereby enabling customization of sub-pages by different individuals. Each of these individuals might not have the ability to create or edit anything but their delegated sub-pages, thus facilitating distributed development of a web page without providing each collaborator with the ability to modify every portion of the web page.

Moreover, support for developing web pages with viewports can be integrated into a user interface builder application. Thus, viewports can be defined and configured by way of a drag-and-drop interface. As a consequence, the web page developer need not engage in the writing of program code with complex conditional logic.

Accordingly, a first example embodiment may involve persistent storage containing web page metadata that defines a web page, first sub-page metadata that defines a first sub-page, and second sub-page metadata that defines a second sub-page, wherein the web page metadata includes specification of a viewport in which the first sub-page metadata or the second sub-page metadata can be placed, and wherein the viewport is associated with an identifier. The first example embodiment may also involve one or more processors configured to: receive, from a client device, a request for the web page; in response to receiving the request, resolve the web page metadata into web content, wherein resolving the web page metadata into the web content includes: (i) determining, based on the identifier, a route associated with the viewport, (ii) determining, based on the route, a set of conditions associated with the viewport, (iii) determining that a particular condition of the set of conditions is satisfied, wherein the particular condition is associated with the first sub-page, and (iv) placing, based on the particular condition being satisfied, the first sub-page metadata in the viewport; and transmit, to the client device, the web content.

A second example embodiment may involve receiving, from a client device, a request for a web page, wherein persistent storage contains web page metadata that defines the web page, first sub-page metadata that defines a first sub-page, and second sub-page metadata that defines a second sub-page, wherein the web page metadata includes specification of a viewport in which the first sub-page metadata or the second sub-page metadata can be placed, and wherein the viewport is associated with an identifier. The second example embodiment may further involve, possibly in response to receiving the request, resolving the web page metadata into web content, wherein resolving the web page metadata into the web content includes: (i) determining, based on the identifier, a route associated with the viewport, (ii) determining, based on the route, a set of conditions associated with the viewport, (iii) determining that a particular condition of the set of conditions is satisfied, wherein the particular condition is associated with the first sub-page, and (iv) placing, based on the particular condition being satisfied, the first sub-page metadata in the viewport. The second example embodiment may transmitting, to the client device, the web content.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts server-side scripting, in accordance with example embodiments.

DETAILED DESCRIPTION

Figure 1:
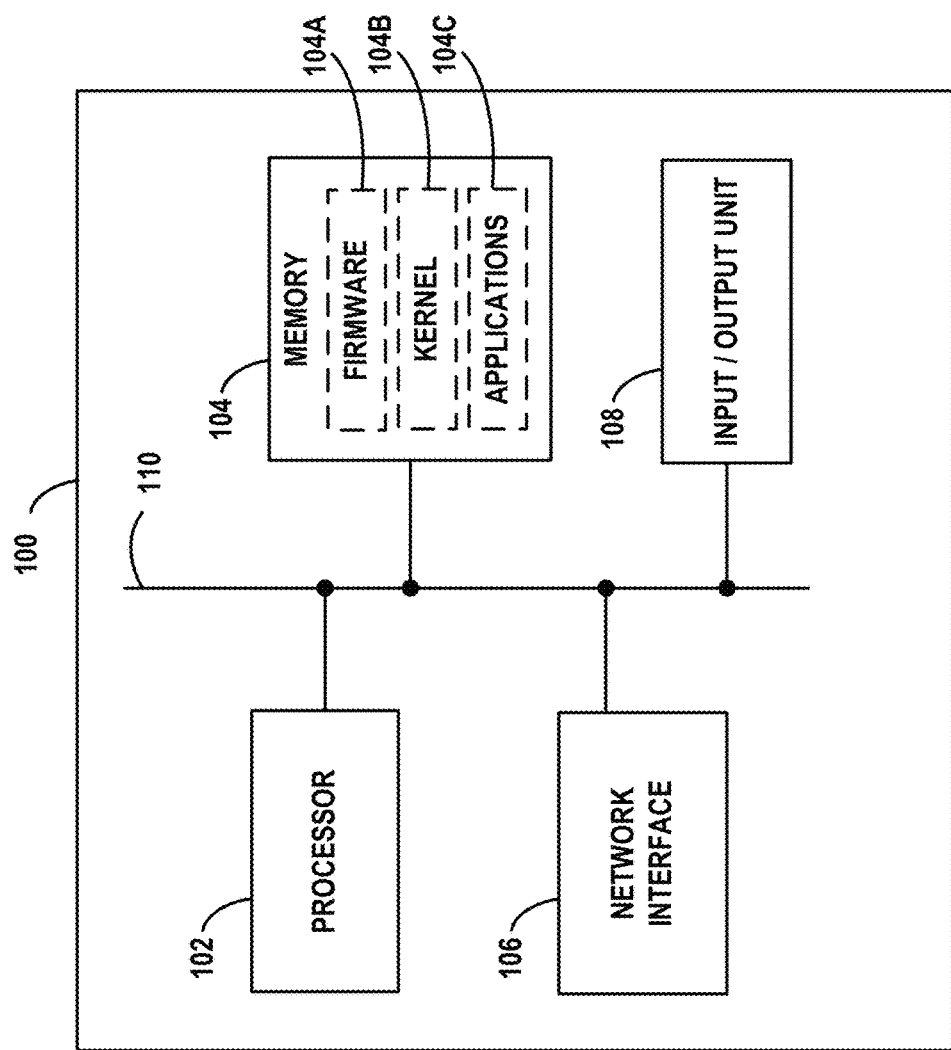
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
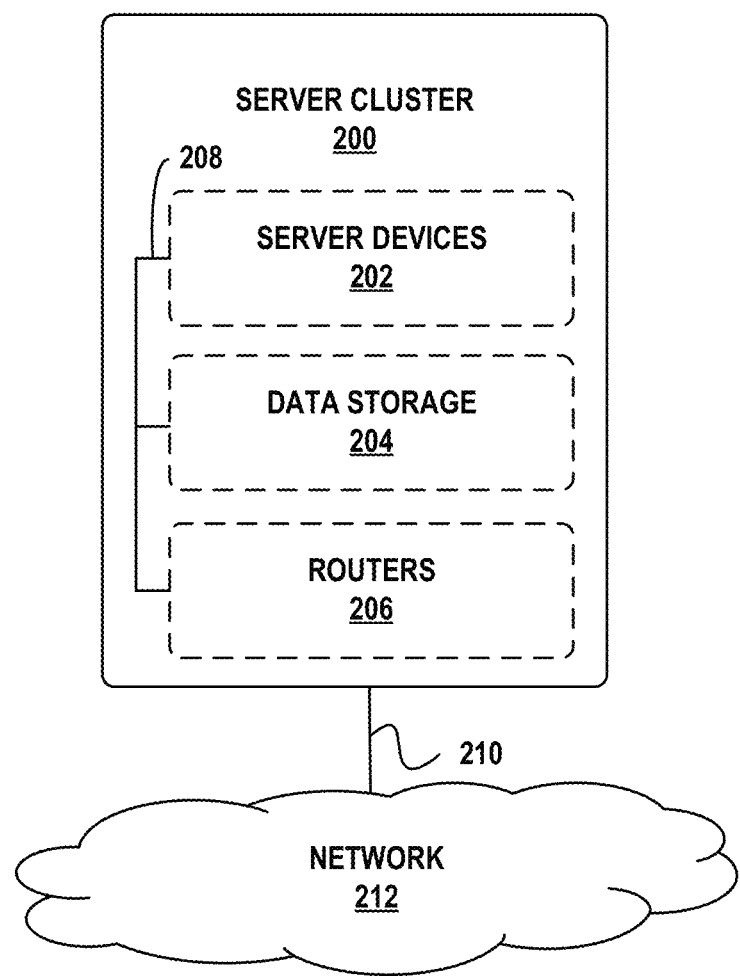
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
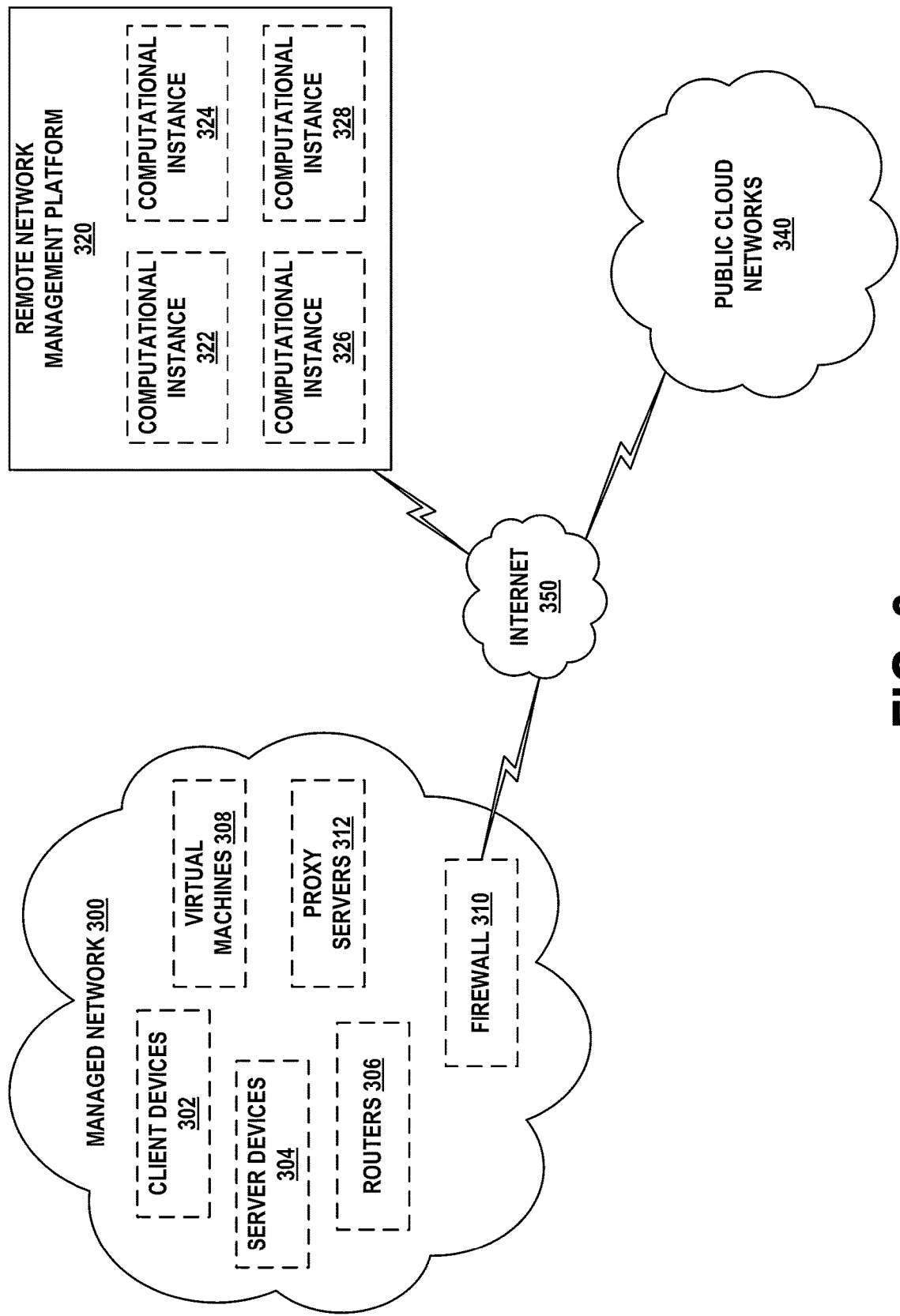
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
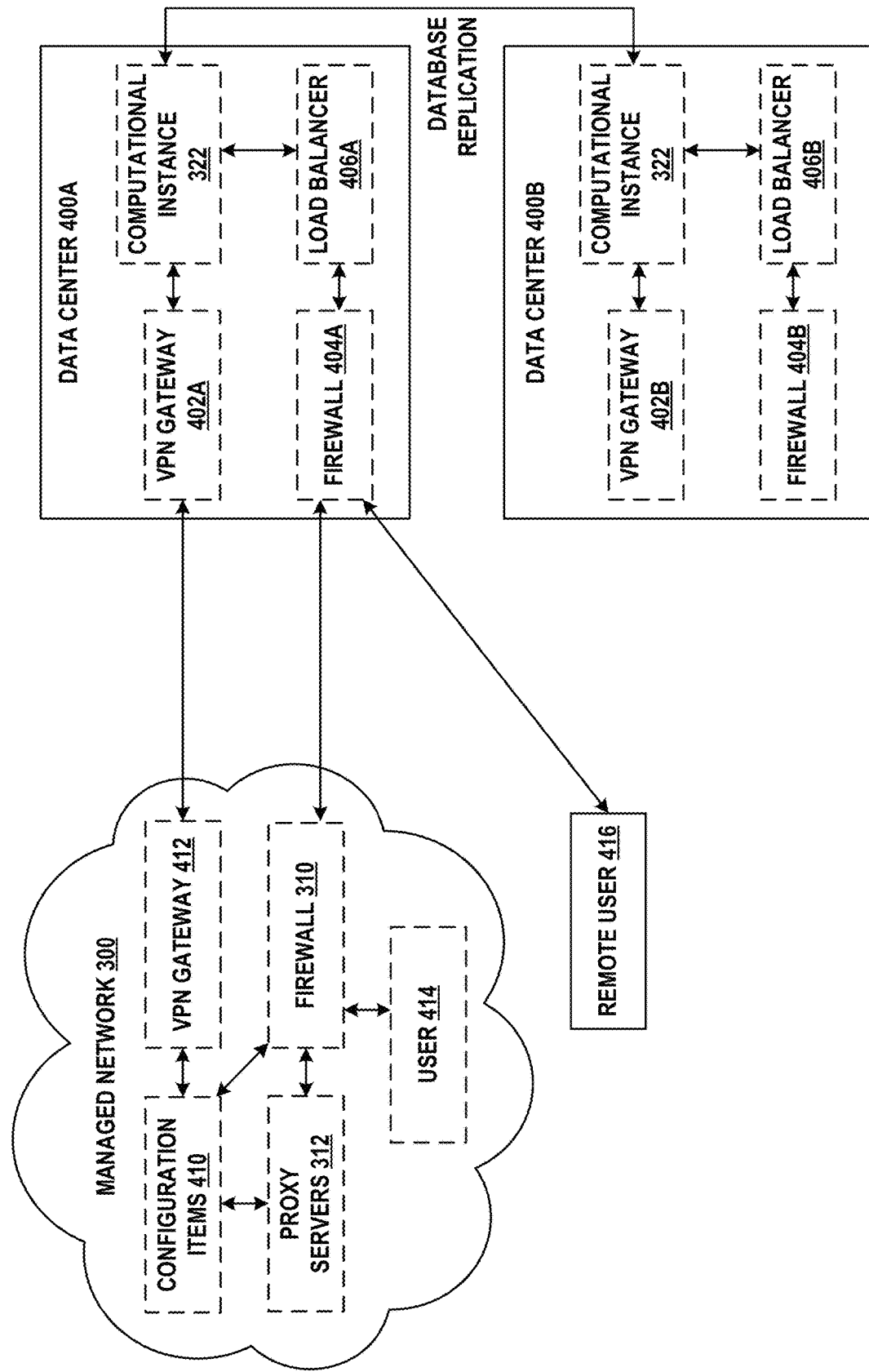
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
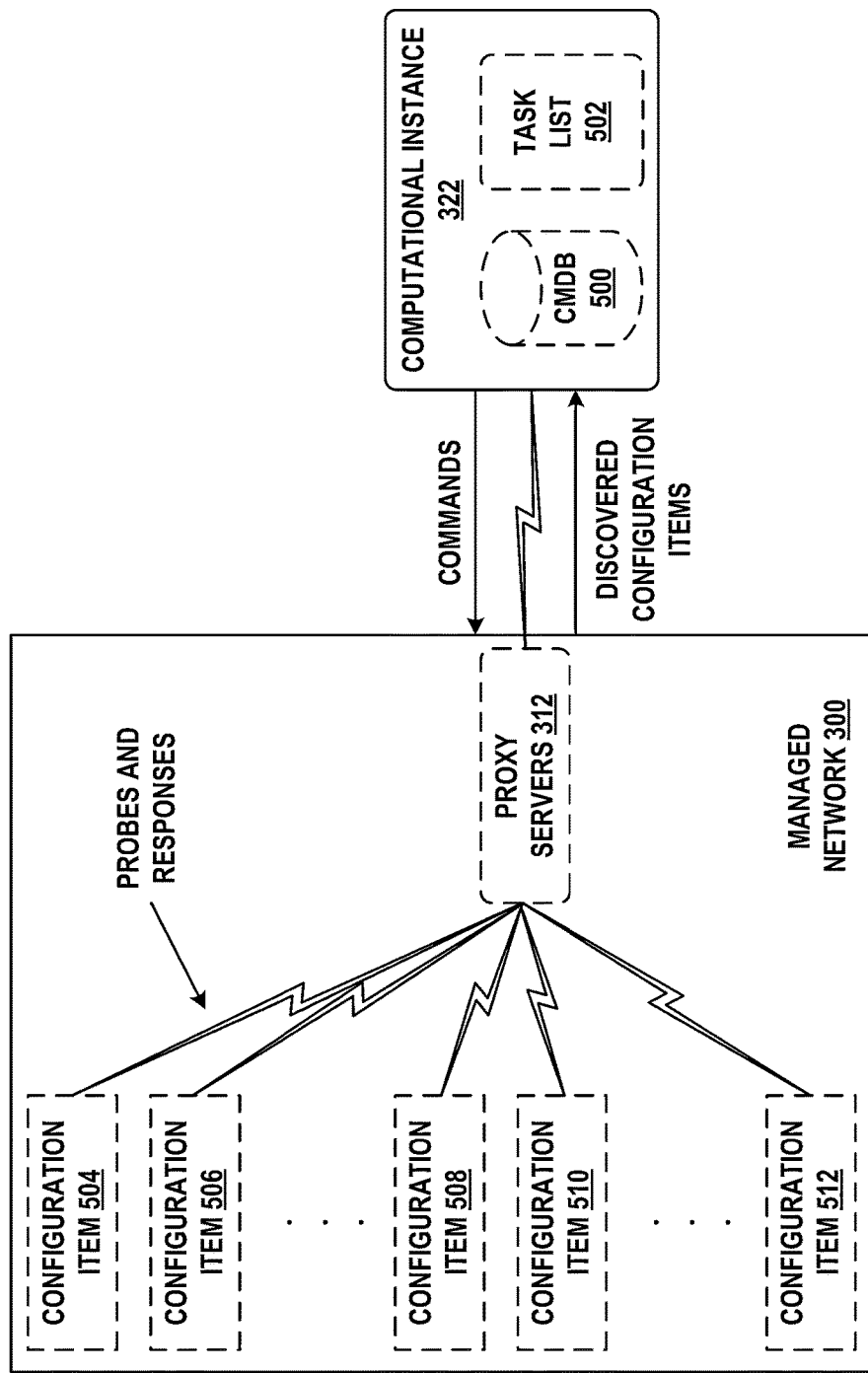
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
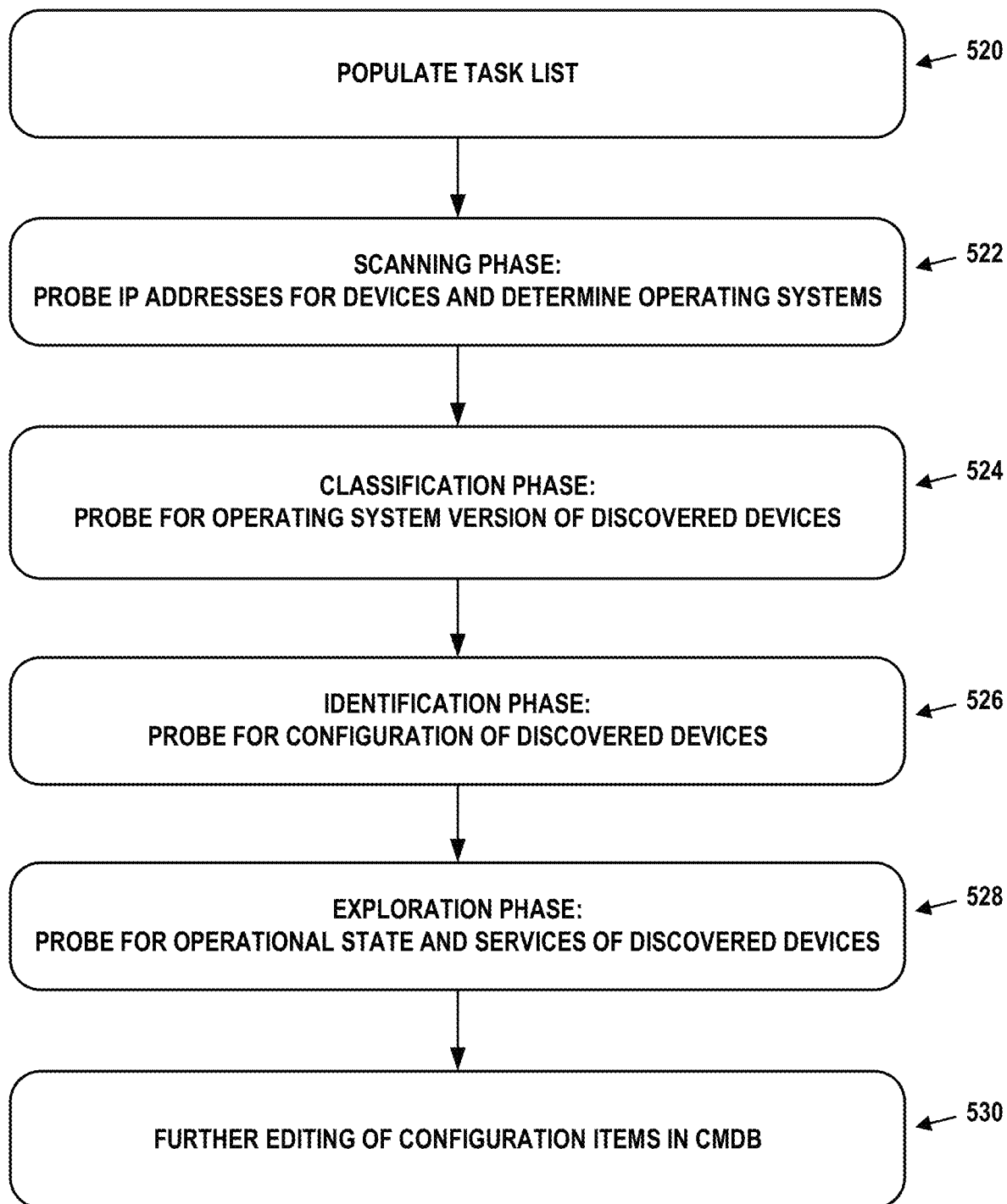
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. IMPROVEMENTS TO DYNAMIC WEB PAGES

A web page can be made dynamic by specifying the content of the web page and then including client-side or server-side scripting. Client-side scripting includes interpreted code that is executed in the user's browser, such as JavaScript, and allows the web page to be updated in response to user input, for example. Server-side scripting includes code, such as PHP scripts, that modifies the content of the web page before it is transmitted to the browser. This allows different versions of the web page to be provided based on state related to an overall transaction involving the user.

Figure 6A:
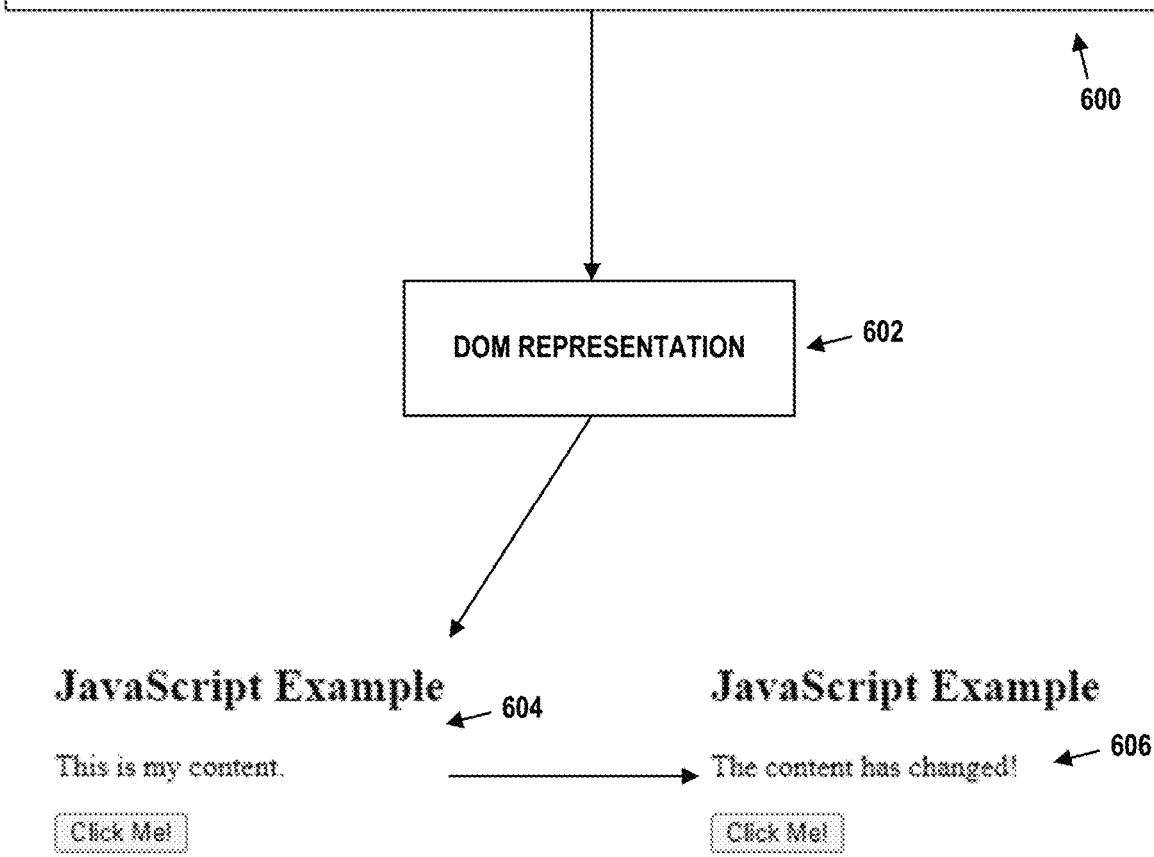
FIG. 6A depicts client-side scripting, in accordance with example embodiments.

FIG. 6A provides a simple example of client-side scripting. Web content 600 defines a web page in HTML and includes JavaScript code embedded into the markup. Particularly, the <p> tag specifies that the demo variable refers to the text "This is my content.", and the <button> tag specifies a button and what appears on it, as well as an action to take when the button is actuated. That action, defined by the onclick variable, instructs a browser to replace the value of the demo variable with the text "The content has changed!"

In practice, this means that when the browser receives web content 600, the browser transforms this content into document object model (DOM) representation 602. This is a tree-like data structure in which each tag within web content 600 is a node, with the nodes arranged according to the relationships between the tags. The browser can then display web content 600 initially as shown in block 604. When the user actuates the button that is labeled "Click Me!", the browser dynamically updates the DOM in accordance with the button's action. The result is shown in block 606.

Client-side scripting is generally used to change how web content that is delivered to a browser gets displayed. Server-side scripting, on the other hand, controls the makeup of the web content that gets delivered to the browser.

FIG. 6B provides a simple example of server-side scripting. Web content 610 a web page in HTML and includes PHP code embedded into the markup. Particularly, a PHP script is enclosed within the <?php . . . ?> tag, and uses a system call to determine current hour in the web server's time zone as an integer in 24-hour format. The PHP script goes on to execute conditional logic, in the form of an if-then-else statement, to determine whether this hour indicates that it is morning, day, or night. Then, the script displays a corresponding message.

Web content 612 is web content 610 after being modified by PHP processing. Notably, the PHP code is replaced with HTML based on the hour of the day being 13 (i.e., 1 pm). The web server delivers web content 612 to the browser, and the web browser displays web content 612 as shown in block 614. Notably, this is just one type of content modification that is possible in a PHP script. Such server-side scripts can generate conditional content based on other variables or function call output. For example, server-side scripts can query a database and generate content from the results of the query.

Both client-side and server-side scripting suffer from a number of disadvantages. Firstly, they require that the web developer is conversant in the respective scripting languages. Secondly, they require that complex logic be embedded within web content. Thirdly, they do not provide sufficient support for conditional content to be placed in specific locations of a web page. Fourthly, they do not support distributed authoring where multiple web developers can collaborate to define conditional content in a fashion that permits specific developers to only modify certain aspects of a web page.

The embodiments herein address these and other limitations by introducing a new paradigm for the displaying of conditional content on web pages. In short, web pages can incorporate viewports, which are configurable sections that support conditional content. This content can be defined by one or more sub-pages, and the sub-page selected for display in the web page is dynamically determined based on system state. Further, each sub-page can have a delegated author who is a user permitted to define the content of that sub-page, but may be restricted from defining the content of other sub-pages or the web page in general. Additionally, each sub-page might or might not have its own uniform resource locator (URL) through which it can be addressed. All of this can be facilitated by a user interface builder application that allows users to drag and drop viewport and other web components onto a canvas that defines the web page.

This approach is particularly useful on the remote network management platform described herein, due to its heavy use of web-based interfaces. But other sites and platforms may benefit as well.

Figure 7:
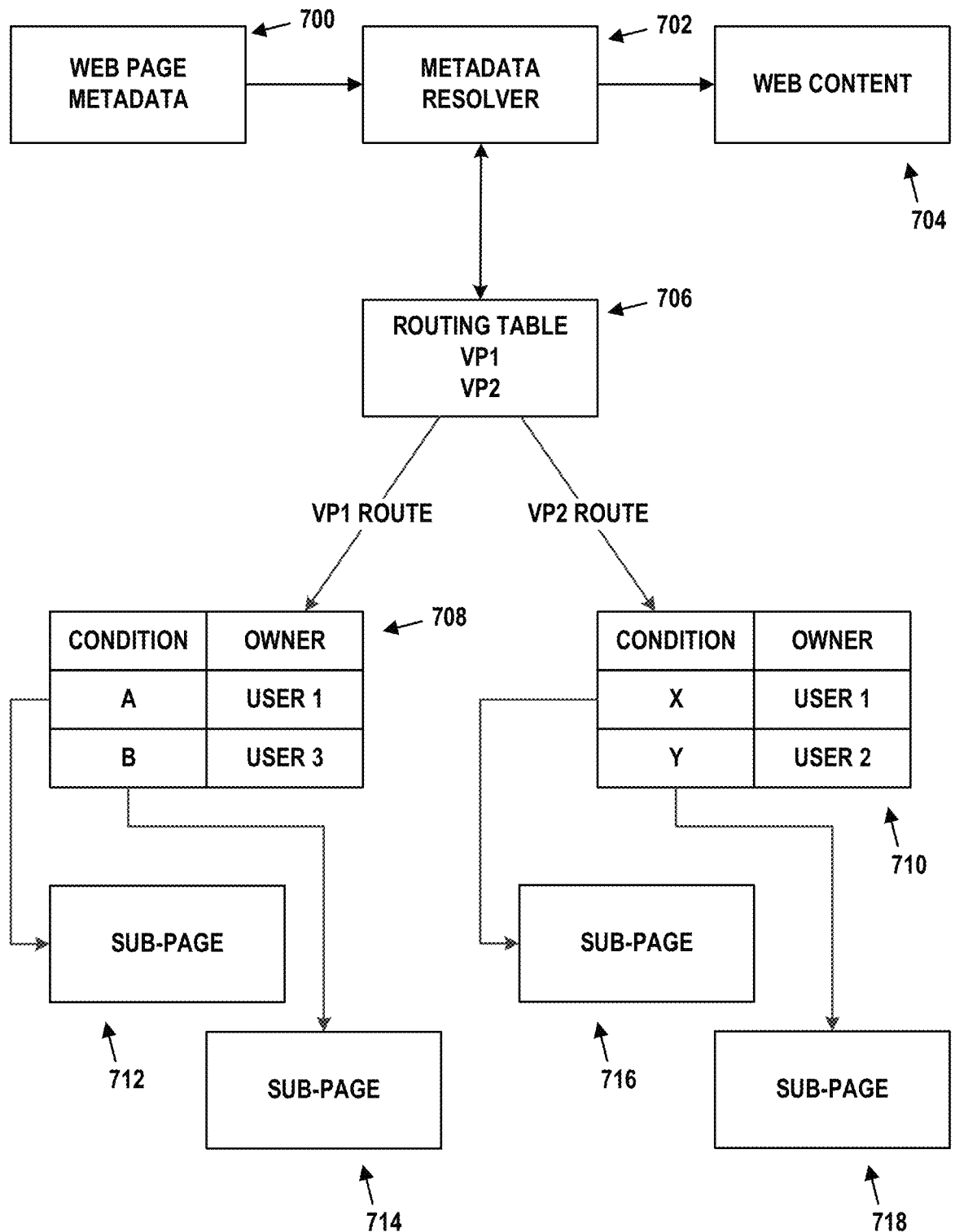
FIG. 7 depicts generating a web page from metadata, in accordance with example embodiments.

An overview of the improvements is shown in FIG. 7, along with modules that facilitate their execution. Unlike conventional web-based systems, the embodiments of FIG. 7 involve using web page metadata 700 to represent a web page. Web page metadata 700 may JavaScript Object Notation (JSON), XML, or some other structured data format. Metadata resolver 702 may be program logic (e.g., an application or part of an application) that transforms web page metadata 700 into web content 704 in accordance with predetermined rules. In some cases, web content 704 may be some combination of HTML, JavaScript, and/or PHP, for example. Thus, the rules may map particular elements of web page metadata 700 to particular elements of web content 704.

A viewport may be defined as part of web page metadata. Such a viewport may have a relative or absolute location within the web page. Further, the viewport may hold a set of one or more web components. As defined herein, web components could be, but are not limited to, avatars, badges, buttons, calendars, cards, checkboxes, containers, forms, icons, images, lists, menus, messages, notifications, pickers, progress bars, sidebars, sliders, tabs, text boxes, toggles, and so on. Thus, web components may be modules of HTML or JavaScript that represent the building blocks of a web page, and the vast majority of web pages consist of an arrangement of such building blocks. Web components may be defined using the metadata itself (e.g., in JSON that is mapped by metadata resolver 702 to the appropriate HTML and/or JavaScript) or by reference (e.g., in JSON elements that refer to externally-stored definitions of the web components).

The exact metadata elements that define a viewport may vary. Regardless, these metadata elements may include a tag that uniquely identifies the viewport within the web page (e.g., contains a string or number that that can be used as an identifier). Notably, multiple viewports per web page may be possible. The tag of each viewport is then looked up in routing table 706 to determine a route used to identify a sub-page of web content with which to fill in the viewport.

In the example shown in FIG. 7, web page metadata 700 includes two viewports, VP1 and VP2, each identified by respective tags in the metadata elements. Accordingly, each viewport has a route in routing table 706 (the VP1 route for viewport VP1 and the VP2 route for viewport VP2). The VP1 route references condition table 708 and the VP2 route references condition table 710.

Each of condition tables 708 and 710 contain conditions that, when evaluated, determine which sub-page is to be displayed in the associated viewport. Condition table 708 indicates that, when condition A is satisfied, sub-page 712 is displayed, but when condition B is satisfied, sub-page 714 is displayed. Condition table 710 indicates that, when condition X is satisfied, sub-page 716 is displayed, but when condition Y is satisfied, sub-page 718 is displayed.

In some cases, the conditions in each condition table may be mutually exclusive so that at most one condition is satisfied at a time. In other cases, the conditions may be such that more than one condition can be satisfied, but the sub-page associated with the first satisfied condition (e.g., as the condition table is traversed from top to bottom) is displayed. Further, a default sub-page may be defined such that it gets displayed if none of the conditions are satisfied.

The conditions in these tables may be any arithmetic or logical expression, and may take as operands any system state variable, constant, or expression. For instance, a condition may be "$user_group='admin'", which is satisfied (true) when the user requesting the web page is in the group 'admin'. In another example, a condition may be "$incident.age>30", which is satisfied when the age of an incident in an incident database is more than 30 days. Many other conditions are possible. In yet another example, the state variable may be a URL or part of a URL associated the web page or a sub-page.

Additionally, each sub-page may be associated with an owner. This field defines a user or group of users who have permission to edit the sub-page. In the example of FIG. 7, user 1 can edit sub-page 712 and sub-page 716, user 2 can edit sub-page 714, and user 3 can edit sub-page 718. In this fashion, the authority to edit sub-pages can be delegated to different individuals within an organization or to individuals in a different organization. Notably, the individuals with authority to edit a sub-page might or might not have the authority to edit the web page as a whole (i.e., the main part of the web page that defines the viewport(s)).

To generate web content 704, a web server may receive a request for a web page from a client device. Metadata resolver 702 may obtain web page metadata 700 from storage (e.g., volatile or non-volatile memory). Metadata resolver 702 may then process web page metadata 700, generating parts of web content 704 based on the metadata elements. When metadata resolver 702 processes metadata elements for a viewport, it may determine the identifier of the viewport, and then look up this identifier in routing table 706. From this lookup, metadata resolver 702 determined a route for the viewport and the associated condition table. Metadata resolver 702 then checks the conditions in the condition table, evaluating these conditions as needed, to identify a sub-page. Metadata resolver 702 then places this sub-page in web content 704 within or in place of the viewport. The web server then transmits web content 704 (e.g., including HTML and/or JavaScript) to the client device.

Figure 8A:
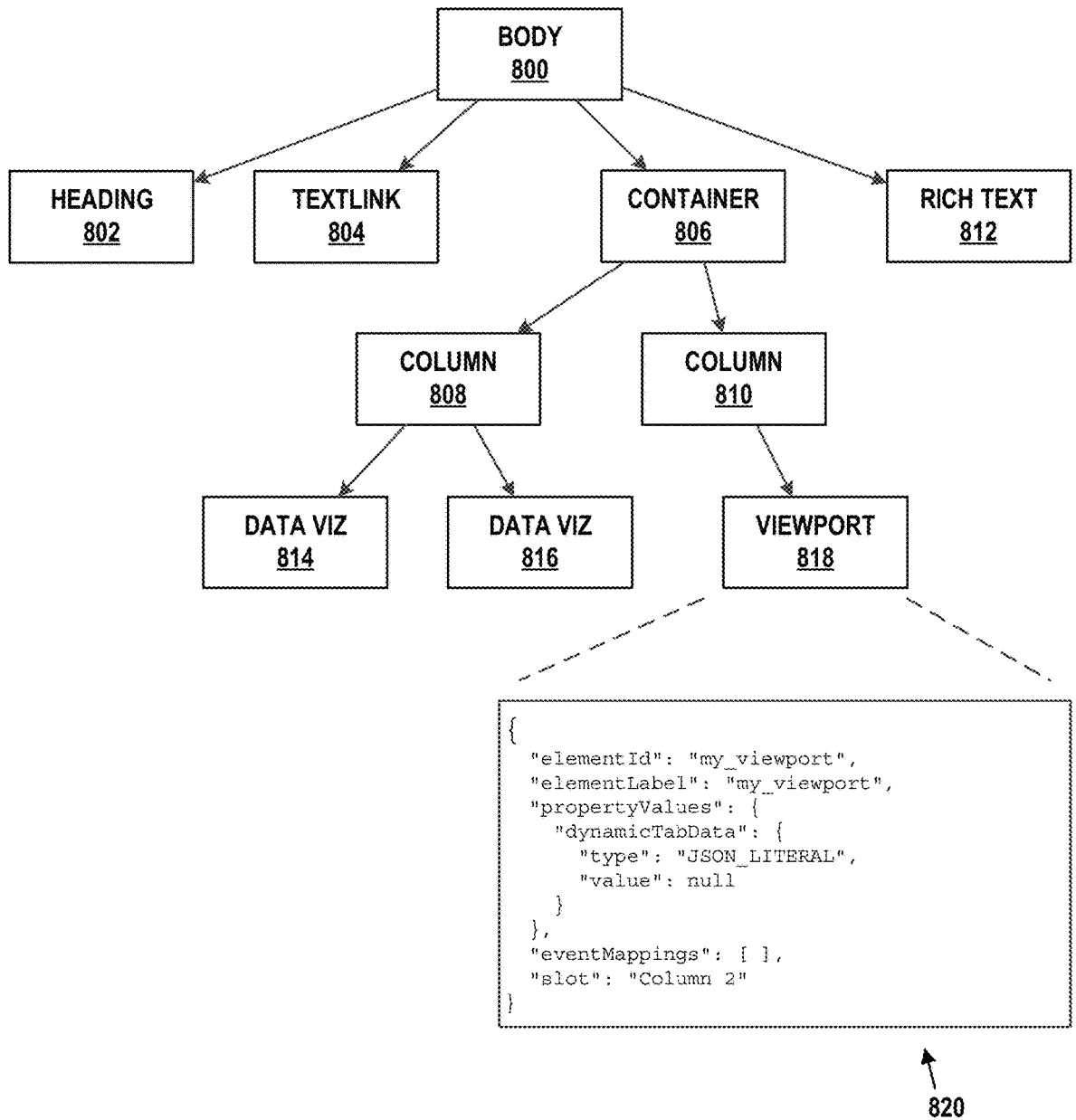
FIG. 8A depicts a structure of web page metadata, in accordance with example embodiments.
Figure 8B:
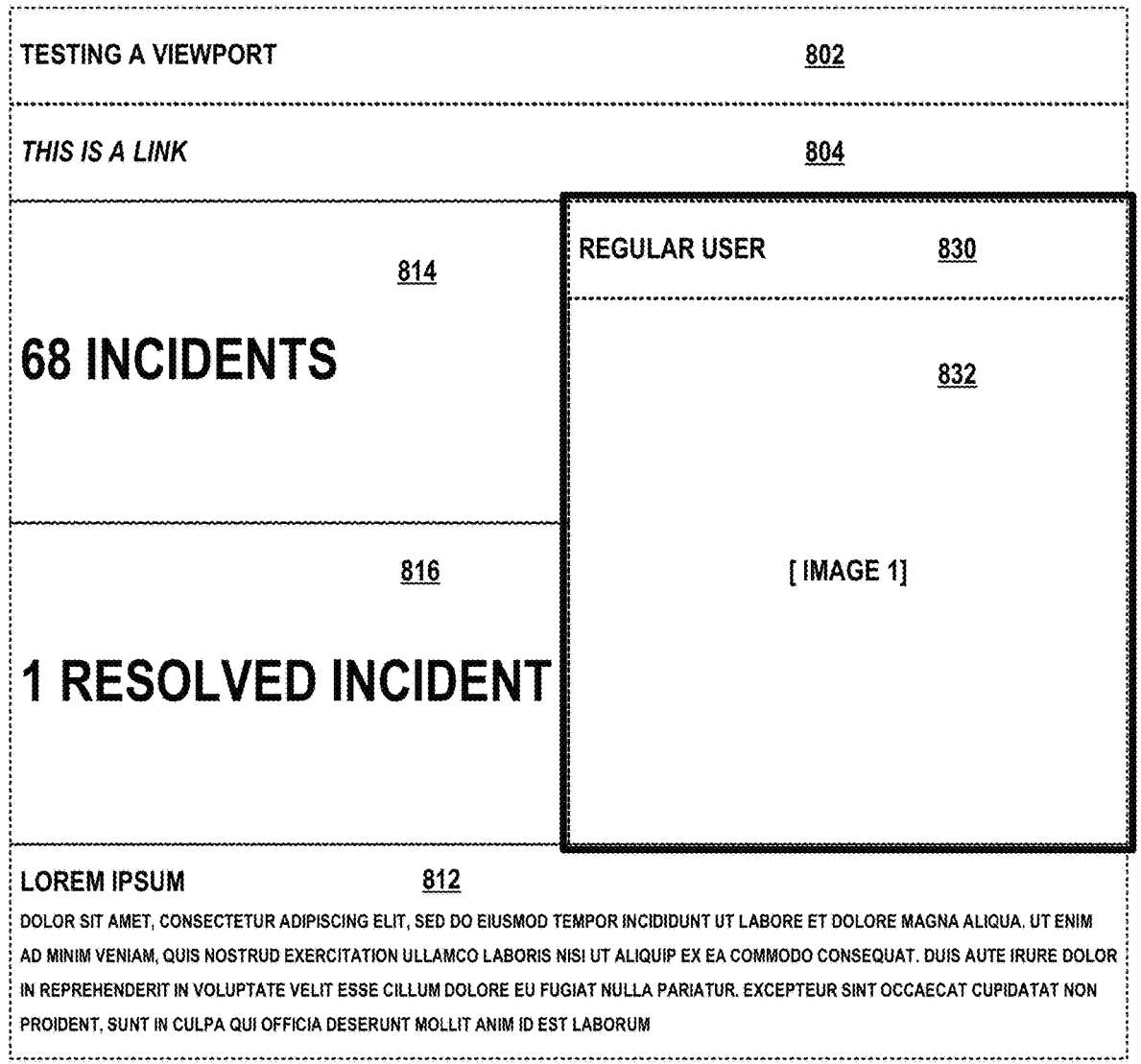
FIG. 8B depicts a web page conditionally generated from the web page metadata of FIG. 8A, in accordance with example embodiments.
Figure 8C:
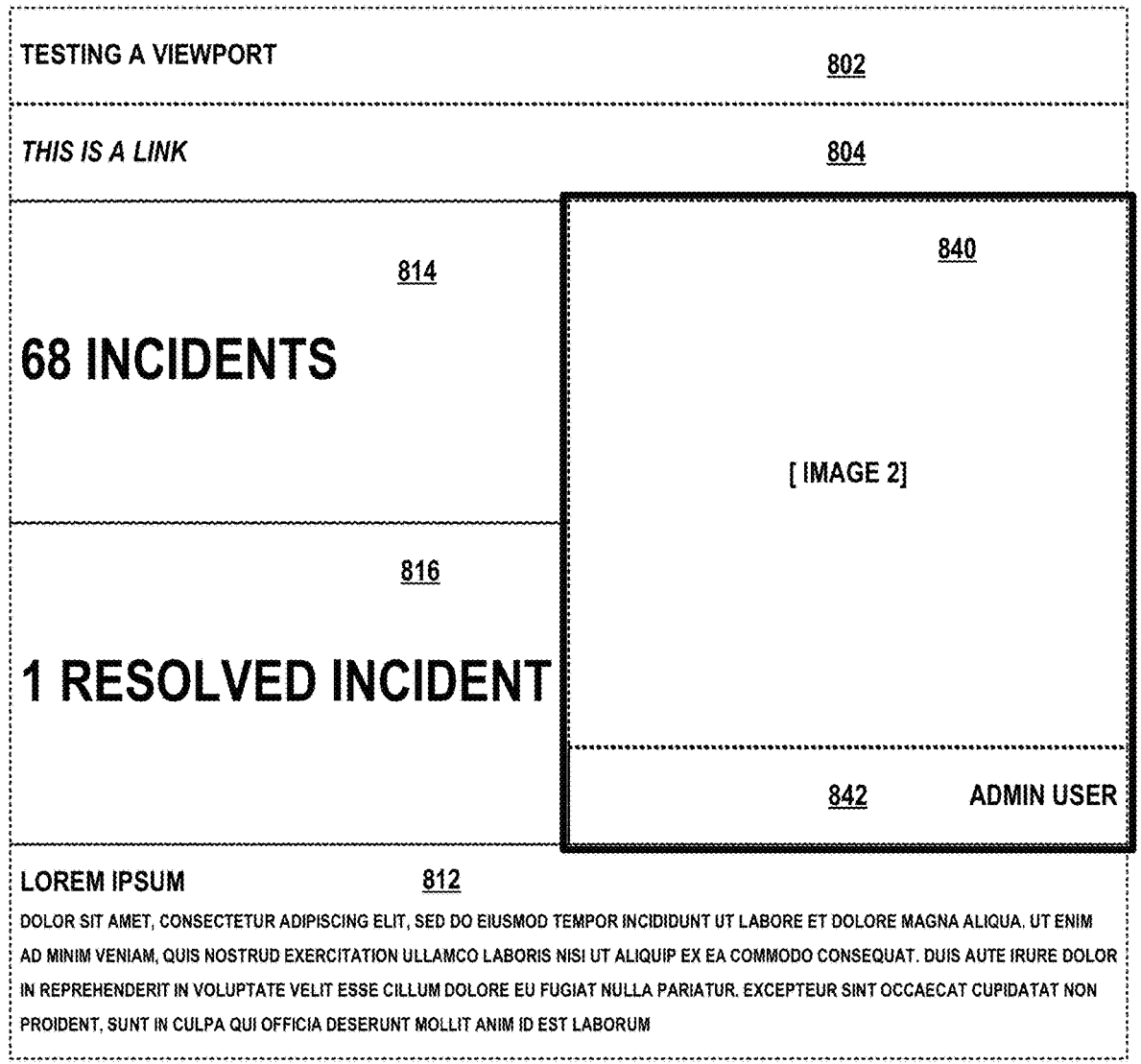
FIG. 8C depicts another web page conditionally generated from the web page metadata of FIG. 8A, in accordance with example embodiments.

FIG. 8A depicts the organization of web page metadata 700 through an example. The organization is tree-like with a root node representing the entire document and child nodes representing nested JSON elements (though other types of structured data formats could be used). Each of these elements defines a particular part of an example web page that includes a viewport. Depictions of the web pages as rendered, with different conditional content appearing in the viewport, is shown in FIGS. 8B and 8C.

In the example of FIG. 8A, web page metadata 700 is encapsulated in body element 800. In turn, body element 800 represents the entirety of the web page and encapsulates heading element 802, textlink element 804, container element 806, and rich text element 812. The elements encapsulated in a body element may be arranged vertically on the web page, i.e., with heading element 802 above textlink element 804, textlink element 804 above container element 806, and container element 806 above rich text element 812. Heading element 802 represents a heading (e.g., a text box with large text), textlink element 804 represents text containing an embedded hyperlink, container element 806 defines a section of the web page in which further elements can be placed, and rich text element 812 contains formatted text capable of being displayed in two or more fonts and/or sizes.

Container element 806 encapsulates column element 808 and column element 810. The elements encapsulated in a container element may be arranged horizontally on the web page, i.e., with column element 808 to the left of column element 810. Column element 808 encapsulates data visualizations 814 and 816, each of which may present a chart, graph, or textual output (e.g., based on a database lookup). The elements encapsulated in a column element may be arranged vertically on the web page, i.e., with data visualization 814 above data visualization 816.

Column element 810 encapsulates viewport element 818. The metadata (JSON) defining viewport 818 is shown in block 820. Notably, this metadata includes the identifier "my_viewport", which is the name of a route that appears in a routing table (e.g., routing table 706). Further, the metadata does not define the content of any sub-pages. This is because the route will refer to a condition table that defines one or more conditions, each associated with a sub-page. In this manner, web page metadata 700 can be defined, edited, and managed separately from sub-page definitions (e.g., in different files potentially stored in different locations and with different authoring permissions).

As noted above, FIGS. 8B and 8C depict web pages rendered from web content 704, each with different conditional content appearing in the viewport. In both of these figures, heading element 802 is positioned above textlink element 804, textlink element 804 is positioned above column elements 808 and 810 (not explicitly labeled), and these columns are positioned above rich text element 812. Column element 808 contains data visualizations 814 and 816 stacked atop one another, and column element 810 contains viewport element 818 (not explicitly labeled but surrounded by a thick line for emphasis).

In FIG. 8B, viewport element 818 contains a first sub-page that includes text box element 830 above image element 832. In FIG. 8C, viewport element 818 contains a second sub-page that includes image element 840 above text box element 842.

The determination of which of these sub-pages to include in web content 704 can be based on any system state, such as programmatic variables, values in database records, and so on. For example, a condition table for viewport element 818 may be arranged such that the first sub-page may be included in web content 704 when the user is not an administrator (e.g., the user's group is not the admin group) and that the second sub-page may be included in web content 704 when the user is an administrator (e.g., the user's group is the admin group). In this manner, different content can be displayed to different users without having to include complex scripting logic within a web page or having to develop two different versions of the web page.

Web page metadata 700 may be automatically generated by a user interface builder application. This application may present a graphical user interface with which the user can drag and drop various web components, viewports, and potentially other objects onto a canvas. The canvas provides a visual approximation of the resulting web page. When the user is satisfied with the design and layout of the web page, the user can publish the web page, causing web page metadata 700 to be stored.

Figure 9:
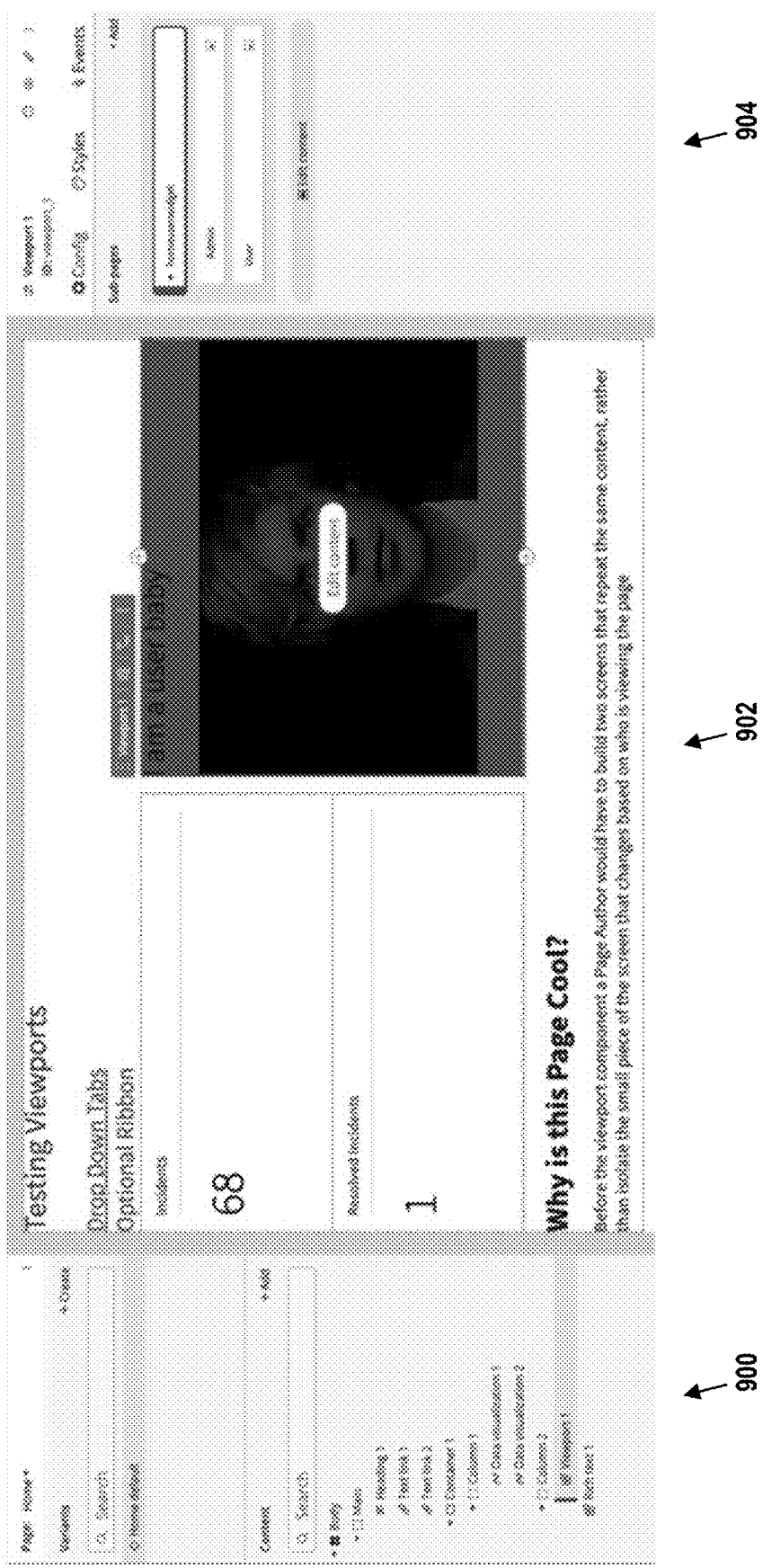
FIG. 9 depicts a graphical user interface builder application, in accordance with example embodiments.

FIG. 9 depicts an example of such a user interface builder. The web page being edited resembles that of FIGS. 8A, 8B, and 8C, but differs slightly.

Column 900 includes, in a series of drop-down menus, a tree-like representation of the nested metadata elements that define the web page. Column 900 may also allow the user to add, remove, and arrange the metadata elements.

Column 902 is the canvas, displaying an approximation of what the web page will look like when it is rendered by a browser. The user can select, click on, or otherwise actuate each of these elements to edit their content, configuration, and/or behavior.

Column 904 contains the interface through which this editing can take place. Notably, the user has selected the viewport for editing, and menus for doing so appear in column 904. Notably, the viewport's route ("viewport_1") is shown as the condition table for this route ("homeuserwidget"). In the condition table, two conditions are shown, one for the user who ultimately views the web page being a member of the administrator group ("Admin") and the other for this user not being a member of the administrator group ("User").

When the user of the user interface builder selects one of these options, they are prompted to edit the associated sub-page content. As shown in FIG. 9, the sub-page for non-administrative users is selected in column 904, and the associated sub-page is displayed for editing in the viewport in column 902. In some embodiments, the user of the user interface builder may need to be granted permission to edit certain sub-pages for purposes of distributed authoring.

VI. EXAMPLE OPERATIONS

Figure 10:
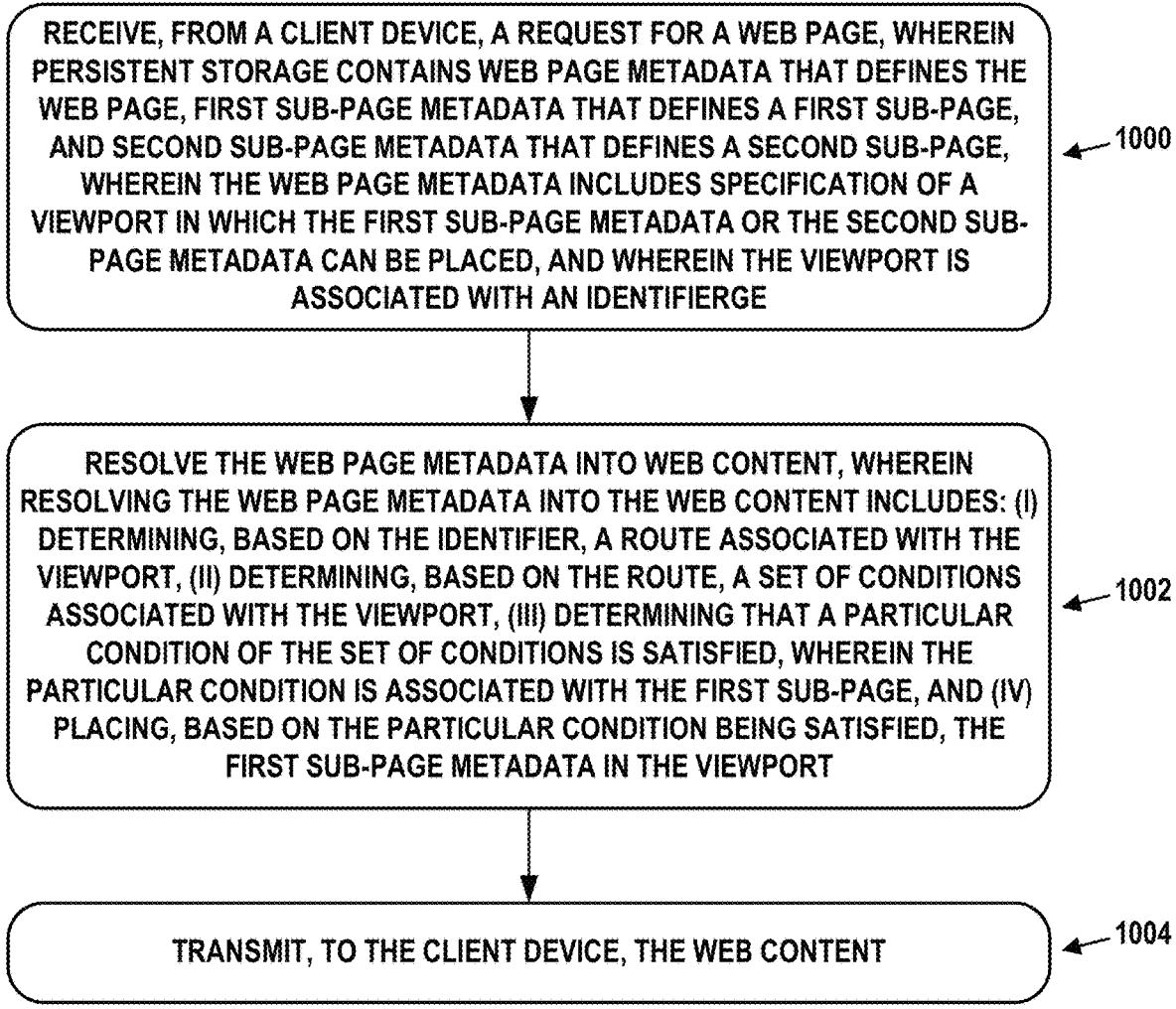
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, from a client device, a request for a web page, wherein persistent storage contains web page metadata that defines the web page, first sub-page metadata that defines a first sub-page, and second sub-page metadata that defines a second sub-page, wherein the web page metadata includes specification of a viewport in which the first sub-page metadata or the second sub-page metadata can be placed, and wherein the viewport is associated with an identifier.

Block 1002 may involve, possibly in response to receiving the request, resolving the web page metadata into web content, wherein resolving the web page metadata into the web content includes: (i) determining, based on the identifier, a route associated with the viewport, (ii) determining, based on the route, a set of conditions associated with the viewport, (iii) determining that a particular condition of the set of conditions is satisfied, wherein the particular condition is associated with the first sub-page, and (iv) placing, based on the particular condition being satisfied, the first sub-page metadata in the viewport.

Block 1004 may involve transmitting, to the client device, the web content.

In some embodiments, the web page metadata, the first sub-page metadata, and the second sub-page metadata are formatted in accordance with JSON or XML.

In some embodiments, the web content is formatted in accordance with HTML and/or JavaScript.

In some embodiments, reception of the web content by the client device causes a web browser of the client device to render the web page from the web content.

In some embodiments, resolving the web page metadata further includes generating units of the web content based on corresponding elements of the web page metadata.

In some embodiments, determining the route associated with the viewport comprises: looking up the identifier in a routing table; and determining that an entry of the routing table associates the route with the identifier.

In some embodiments, the set of conditions associated with the viewport are stored in a condition table associating conditions to sub-pages, and determining that the particular condition of the set of conditions is satisfied comprises: evaluating at least some of the set of conditions; and determining that the particular condition is true.

In some embodiments, the particular condition is a logical or arithmetic expression involving one or more state variables of the system as operands. The one or more state variables may include a user group specification of a user that requested the web page.

In some embodiments, the one or more processors are further configured to: receive, from a second client device, a second request for the web page; in response to receiving the second request, resolve the web page metadata into second web content, wherein resolving the web page metadata into the second web content includes: (i) determining, based on the identifier, the route associated with the viewport, (ii) determining, based on the route, the set of conditions associated with the viewport, (iii) determining that a second particular condition of the set of conditions is satisfied, wherein the second particular condition is associated with the second sub-page, and (iv) placing, based on the second particular condition being satisfied, the second sub-page metadata in the viewport; and transmit, to the second client device, the second web content.

In some embodiments, the persistent storage also contains third sub-page metadata that defines a third sub-page and fourth sub-page metadata that defines a fourth sub-page, wherein the web page metadata includes specification of a second viewport in which the third sub-page metadata or the fourth sub-page metadata can be placed, wherein the second viewport is associated with a second identifier, and wherein the one or more processors are further configured to: receive, from a second client device, a second request for the web page; in response to receiving the second request, resolve the web page metadata into second web content, wherein resolving the web page metadata into the second web content includes: (i) determining, based on the second identifier, a second route associated with the second viewport, (ii) determining, based on the second route, a second set of conditions associated with the second viewport, (iii) determining that a second particular condition of the second set of conditions is satisfied, wherein the second particular condition is associated with the third sub-page, and (iv) placing, based on the second particular condition being satisfied, the third sub-page metadata in the second viewport; and transmit, to the second client device, the second web content.

In some embodiments, a first author is granted exclusive modification rights to the first sub-page, and a second author is granted exclusive modification rights to the second sub-page.

In some embodiments, placing the first sub-page metadata in the viewport comprises replacing the specification of the viewport with the first sub-page metadata or incorporating the first sub-page metadata into the specification of the viewport.

VII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing web page metadata that defines a web page, first sub-page metadata that defines a first sub-page, and second sub-page metadata that defines a second sub-page, wherein the web page metadata includes specification of a viewport in which the first sub-page metadata or the second sub-page metadata can be placed, wherein the specification of the viewport defines a location within the web page, and wherein the viewport is associated with an identifier; and
   one or more processors configured to:
      receive, from a client device, a request for the web page;
      in response to receiving the request, resolve the web page metadata into web content, wherein resolving the web page metadata into the web content includes: (i) determining, based on looking up the identifier in a routing table that associates identifiers with routes, a route associated with the identifier, (ii) determining, based on the route, a condition table that associates conditions with sub-pages, (iii) determining, based on looking up a particular condition in the condition table, that the particular condition is satisfied, wherein the particular condition is associated with the first sub-page, and (iv) placing, based on the particular condition being satisfied, the first sub-page metadata in the viewport; and
      transmit, to the client device, the web content.

2. The system of claim 1, wherein reception of the web content by the client device causes a web browser of the client device to render the web page from the web content.

3. The system of claim 1, wherein resolving the web page metadata further includes generating units of the web content based on corresponding elements of the web page metadata.

4. The system of claim 1, wherein the particular condition is a logical or arithmetic expression involving one or more state variables of the system as operands.

5. The system of claim 4, wherein the one or more state variables include a user group specification of a user that requested the web page.

6. The system of claim 1, wherein the one or more processors are further configured to:
   receive, from a second client device, a second request for the web page;
   in response to receiving the second request, resolve the web page metadata into second web content, wherein resolving the web page metadata into the second web content includes: (i) determining, based on looking up the identifier in the routing table, the route associated with the identifier, (ii) determining, based on the route, the condition table, (iii) determining, based on looking up a second particular condition in the condition table, that the second particular condition is satisfied, wherein the second particular condition is associated with the second sub-page, and (iv) placing, based on the second particular condition being satisfied, the second sub-page metadata in the viewport; and
   transmit, to the second client device, the second web content.

7. The system of claim 1, wherein the persistent storage also contains third sub-page metadata that defines a third sub-page and fourth sub-page metadata that defines a fourth sub-page, wherein the web page metadata includes specification of a second viewport in which the third sub-page metadata or the fourth sub-page metadata can be placed, wherein the second viewport is associated with a second identifier, and wherein the one or more processors are further configured to:
   receive, from a second client device, a second request for the web page;
   in response to receiving the second request, resolve the web page metadata into second web content, wherein resolving the web page metadata into the second web content includes: (i) determining, based on looking up the second identifier in the routing table, a second route associated with the second identifier, (ii) determining, based on the second route, a second set of condition table that associates further conditions with further sub-pages, (iii) determining, based on looking up a second particular condition in the second condition table, that the second particular condition is satisfied, wherein the second particular condition is associated with the third sub-page, and (iv) placing, based on the second particular condition being satisfied, the third sub-page metadata in the second viewport; and transmit, to the second client device, the second web content.

8. The system of claim 1, wherein a first author is granted exclusive modification rights to the first sub-page, and wherein a second author is granted exclusive modification rights to the second sub-page.

9. The system of claim 1, wherein placing the first sub-page metadata in the viewport comprises replacing the specification of the viewport with the first sub-page metadata or incorporating the first sub-page metadata into the specification of the viewport.

10. A computer-implemented method comprising:

receiving, from a client device, a request for a web page, wherein persistent storage containing web page metadata that defines a web page, first sub-page metadata that defines a first sub-page, and second sub-page metadata that defines a second sub-page, wherein the web page metadata includes specification of a viewport in which the first sub-page metadata or the second sub-page metadata can be placed, wherein the specification of the viewport defines a location within the web page, and wherein the viewport is associated with an identifier; and in response to receiving the request, resolving the web page metadata into web content, wherein resolving the web page metadata into the web content includes: (i) determining, based on looking up the identifier in a routing table that associates identifiers with routes, a route associated with the identifier, (ii) determining, based on the route, a condition table that associates conditions with sub-pages, (iii) determining, based on looking up a particular condition in the condition table, that the particular condition of the set of conditions is satisfied, wherein the particular condition is associated with the first sub-page, and (iv) placing, based on the particular condition being satisfied, the first sub-page metadata in the viewport; and transmitting, to the client device, the web content.

11. The computer-implemented method of claim 10, wherein resolving the web page metadata further includes generating units of the web content based on corresponding elements of the web page metadata.

12. The computer-implemented method of claim 10, wherein the particular condition is a logical or arithmetic expression involving one or more state variables as operands.

13. The computer-implemented method of claim 12, wherein the one or more state variables include a user group specification of a user that requested the web page.

14. An article of manufacture including a non-transitory computer-readable medium, having stored thereon program instructions that, upon execution by a computing system, cause the computing system to perform operations comprising:

receiving, from a client device, a request for a web page, wherein persistent storage containing web page metadata that defines a web page, first sub-page metadata that defines a first sub-page, and second sub-page metadata that defines a second sub-page, wherein the web page metadata includes specification of a viewport in which the first sub-page metadata or the second sub-page metadata can be placed, wherein the specification of the viewport defines a location within the web page, and wherein the viewport is associated with an identifier;

in response to receiving the request, resolving the web page metadata into web content, wherein resolving the web page metadata into the web content includes: (i) determining, based on looking up the identifier in a routing table that associates identifiers with routes, a route associated with the identifier, (ii) determining, based on the route, a condition table that associates conditions with sub-pages, (iii) determining, based on looking up a particular condition in the condition table, that the particular condition is satisfied, wherein the particular condition is associated with the first sub-page, and (iv) placing, based on the particular condition being satisfied, the first sub-page metadata in the viewport; and transmitting, to the client device, the web content.

15. The system of claim 1, wherein the conditions associated with the sub-pages comprises one or more conditions that, when evaluated, determine whether the first sub-page is to be displayed in the viewport, and wherein the particular condition is an arithmetic or logical expression.

16. The computer-implemented method of claim 10, wherein reception of the web content by the client device causes a web browser of the client device to render the web page from the web content.

17. The computer-implemented method of claim 10, wherein a first author is granted exclusive modification rights to the first sub-page, and wherein a second author is granted exclusive modification rights to the second sub-page.

18. The computer-implemented method of claim 10, wherein placing the first sub-page metadata in the viewport comprises replacing the specification of the viewport with the first sub-page metadata or incorporating the first sub-page metadata into the specification of the viewport.

19. The article of manufacture of claim 14, wherein a first author is granted exclusive modification rights to the first sub-page, and wherein a second author is granted exclusive modification rights to the second sub-page.

20. The article of manufacture of claim 14, wherein placing the first sub-page metadata in the viewport comprises replacing the specification of the viewport with the first sub-page metadata or incorporating the first sub-page metadata into the specification of the viewport.

* * * * *